United States Patent [19]

Iwasaki

[11] Patent Number: 5,315,209

[45] Date of Patent: May 24, 1994

[54] COLOR CATHODE RAY TUBE WITH SELECTIVE LIGHT ABSORPTION FILM

[75] Inventor: Yasuo Iwasaki, Nagaokakyo, Japan

[73] Assignee: Mitsubishi Denki Kabushiki Kaisha, Kyoto, Japan

[21] Appl. No.: 42,908

[22] Filed: Mar. 5, 1993

Related U.S. Application Data

[63] Continuation of Ser. No. 762,473, Sep. 19, 1991, abandoned.

[30] Foreign Application Priority Data

Sep. 27, 1990 [JP] Japan .................. 2-259685

[51] Int. Cl.$^5$ ........................................... H01J 29/88
[52] U.S. Cl. ................................. 313/478; 313/313;
  313/468; 313/112; 313/479; 348/834; 348/835
[58] Field of Search ............... 313/474, 478, 479, 467,
  313/468, 112, 313, 466, 477 R, 480; 358/252,
  253, 250, 311; 359/601

[56] References Cited

U.S. PATENT DOCUMENTS

| | | | |
|---|---|---|---|
| 3,504,212 | 3/1970 | Wollentin et al. | 313/478 X |
| 4,663,562 | 5/1987 | Miller et al. | 313/478 |
| 4,728,856 | 3/1988 | Iwasaki et al. | 313/480 X |
| 4,769,347 | 9/1988 | Cook et al. | 313/480 X |
| 4,831,307 | 5/1989 | Takenaka et al. | 313/478 |
| 4,900,984 | 2/1990 | Itou et al. | 313/479 |
| 4,958,148 | 9/1990 | Olson | 350/276 R X |
| 4,987,338 | 1/1991 | Itou et al. | 313/478 |

FOREIGN PATENT DOCUMENTS

| | | |
|---|---|---|
| 0276459 | 8/1988 | European Pat. Off. . |
| 0335680 | 4/1989 | European Pat. Off. . |
| 3204895 | 9/1982 | Fed. Rep. of Germany . |
| 3524899 | 1/1986 | Fed. Rep. of Germany . |
| 3700144 | 7/1987 | Fed. Rep. of Germany . |
| 9013906 | 11/1990 | PCT Int'l Appl. . |
| 1154500 | 6/1969 | United Kingdom . |
| 1231979 | 5/1971 | United Kingdom . |
| 2161983 | 1/1986 | United Kingdom . |

Primary Examiner—Donald J. Yusko
Assistant Examiner—Ashok Patel

[57] ABSTRACT

A color cathode ray tube includes a face plate, and a selective light absorption film formed on the external surface of the face plate to improve the emission tint, the film having a predetermined characteristic of spectral transmittance. The selective light absorption film is formed of a coating material which consists of a base coating including an alcoholic solution of silicon alkoxide having —OH group or —OR group, and an organic or inorganic dye or pigment mixed into the base coating. Such a coating material is applied onto the external surface of the face plate to form the selective light absorption film. The selective light absorption film has main and auxiliary absorbing bands. If the fluorescent face of the face plate includes a blue fluorescent element of ZnS:Ag, a green fluorescent element of ZnS:Au, Cu and Al and a red fluorescent element of $Y_2O_2S$:Eu, the selection is made that the absorption peak of the main absorbing band has a wavelength equal to 580 nm and the absorption peak of the auxiliary absorbing band has a wavelength equal to 660 nm.

7 Claims, 8 Drawing Sheets

COLOR CATHODE RAY TUBE WITH SELECTIVE LIGHT ABSORPTION FILM

This application is a continuation of application Ser. No. 07/762,473 filed on Sep. 19, 1991, now abandoned.

BACKGROUND OF THE INVENTION

1. Field of the Invention

The present invention relates to a color cathode ray tube having a face plate and a selective light absorption film formed by applying a selective light absorption coating onto the face plate.

2. Description of the Related Art

Recently, color cathode ray tubes are being increased in size and improved in luminance and focusing performances. Accordingly, the voltage to be applied to the fluorescent screen of the cathode ray tubes, that is, the acceleration voltage of the electron beam is also being increased.

For example, the conventional 21-inch type color cathode ray tubes have a voltage to be applied to their fluorescent screen that is on the order of 25 KV to 27 KV. In more recent 30-inch type color cathode ray tubes, however, it is used for higher voltages in the range between 30 KV and 34 KV to be applied to the fluorescent screens.

For this reason, the external surface of the face plate in the color cathode ray tube tends to become charged up, resulting in easy deposition of fine dusts on the external surface of the face plate, so the screen of the color cathode ray tube is easily contaminated. As a result, the color cathode ray tube will be degraded in luminance performance.

The charged up face plate of the color cathode ray tube may readily cause a discharge to a person approaching the cathode ray tube which is obviously a very unpleasant sensation.

FIG. 3 is a graph illustrating variations of surface potential on the face plate of a cathode ray tube. In this graph, a curve L shows variations of surface potential on power-on while a curve L1 shows variations of surface potential on power-off.

In order to eliminate such a charging-up in the external face plate surface of the cathode ray tube, an anti-charge treatment type cathode ray tube has been recently used which includes a smooth, transparent conductive film formed on the external surface of the face plate, this film causing any charge to escape to ground.

FIG. 4 shows an anti-charge treatment type cathode ray tube comprising a neck portion 6 in which an electron gun is mounted. The neck portion 6 includes a deflecting yoke 7 for deflecting the electron beam, which is arranged therein at the forward end.

The cathode ray tube also comprises a funnel portion 13, a face plate portion 4 and a high-voltage terminal 5. The deflecting yoke 7 is connected to a source of deflection power through a lead 7a while the electron gun is connected to a source of drive power through a lead 6a. The high-voltage terminal 5 is connected to a source of high-voltage power through a lead 5a.

In such an arrangement, an electron beam emitted from the electron gun in the neck portion 6 is electromagnetically deflected externally by the deflecting yoke 7 while at the same time a high voltage is applied to a fluorescent screen on the inner face of the face plate portion 4 through the high-voltage terminal 5. The electron beam will be accelerated to form an energy which will excite the fluorescent screen of the face plate portion 4 to produce a light output therefrom.

Under the influence of the high voltage applied to the inner fluorescent screen of the face plate portion 4, the potential on the external surface of the face plate portion 4 will be changed, leading to bad effects such as deposition of dust and so on, as described above.

In order to overcome such a problem, a transparent and smooth conductive film 1 is formed on the external surface of the face plate portion 4, as shown in FIG. 4. Charge on the transparent conductive film 1 can be intentionally leaked to ground such that the charging-up of the screen will be prevented.

In this anti-charge treatment type cathode ray tube 3, the connection of the transparent conductive film 1 to ground is accomplished by a conductive tape 12 connecting the transparent conductive film 1 with a metallic explosion-proof band 8 which is wound about the sidewall of the face plate portion 4, as shown in FIG. 4.

The metallic explosion-proof band 8 is connected to ground 10A through a grounding line 10 which in turn is connected to a mounting ear 9. Thus, the transparent conductive film 1 can be easily connected to ground.

Broken curves M and M1 in FIG. 3 illustrate variations of potential on the external surface of the face plate portion 4 of the anti-charge treatment type cathode ray tube 3, on which the smooth and transparent conductive film 1 is formed, on power-on and power-off, respectively. It can be understood from this that the charging-up is greatly reduced compared with the prior art.

The smooth, transparent conductive film 1 formed on the face plate portion 4 is required to have some degree of hardness and adhesion. Therefore, the conductive film 1 is generally formed of silica ($SiO_2$) and its family of materials.

One of the conventional processes for forming the smooth, transparent conductive film 1 is one which comprises the steps of uniformly and smoothly applying an alcoholic solution of silicon alkoxide having a functional group such as —OH group or —OR group onto the external surface of the face plate portion 4 of the cathode ray tube as by using the spin-coating process or the like, and then baking the layer of alcoholic solution at a relatively low temperature, for example, 100° C. or less.

The smooth, transparent conductive film 1 formed by such a process is porous and has silanol group. Therefore, this film can absorb moisture in air to reduce the surface resistance thereof.

However, the smooth, transparent conductive film 1 formed in accordance with the prior art loses —OH in the silanol group and also moisture is absorbed in the porous portion when the film 1 is baked at raised temperatures. Thus, the surface resistance of the conductive film 1 will be increased and so will not provide the desired conductivity. For this reason, the smooth, transparent conductive film 1 must be baked at lower temperatures. This will in turn degrade the strength of the film.

If the smooth, transparent conductive film of the prior art is used under dry conditions for a long time, it loses the moisture absorbed in the porous portion so that the surface resistance thereof increases with time. Once the moisture is lost from the film, it is difficult to get moisture is re-penetrate the film.

As described above, the smooth and transparent conductive film 1 formed in accordance with the prior art is disadvantageous in strength and long term resistance stability. In order to overcome such a problem, the alkoxide structure in the aforementioned coating was joined with a metal element such as zirconium (Zr) or the like to provide electrical conductivity. However, it is not expected that this provides a great improvement to the aforementioned problem.

Another process for fundamentally solving these problems is known which comprises the steps of dispersing finely divided particles of tin oxide ($SnO_2$) or indium oxide ($In_2O_3$) as an electrically conductive filler in the alcoholic solution of silicon alkoxide, then adding a trace amount of phosphorus (P) or antimony (Sb) in the mixture to form a liquid coating having a semiconductor-like property, uniformly and smoothly applying the liquid coating on the external surface of the face plate portion 4 of the cathode ray tube in any suitable manner such as by using the spin-coating process, and finally baking the applied coating at a relatively high temperature in the range between 100° C. and 200° C.

Such a process can provide a smooth and transparent conductive film which has an increased strength and a long term resistance stability under any circumstances.

Although such a process is satisfactory for its intended purpose, a further process has been more recently developed which can provide a colored transparent conductive film to improve a color cathode ray tube in contrast and color tone, in response to an increased requirement for high quality in color TV.

The further process comprises the steps of providing a base coating to be formed into a transparent conductive film, mixing an organic or inorganic dye or pigment into the base coating to form a colored selective light absorption coating, and applying the colored coating onto the external surface of a face plate of a color cathode ray tube in any suitable manner such as spin-coating to form a selective light absorption film. In such a manner, the further process provides an anti-charge treatment type color cathode ray tube.

FIG. 5 shows the structure of an anti-charge treatment type color cathode ray tube having a selective light absorption film 22. This anti-charge treatment type color cathode ray tube is exactly the same as that of FIG. 4, except for the anti-charge treatment type selective light absorption film 22.

FIG. 6 illustrates the optical property of such an anti-charge treatment type selective light absorption film 22 constructed in accordance with the prior art. In this figure, a character B shows a spectrum distribution with respect to relative luminous intensity in a blue fluorescent material of the sulfide family such as active zinc sulfide with silver (ZnS:Ag) on the fluorescent screen of the color cathode ray tube. This spectrum distribution has a main spectral wavelength equal to about 450 nm.

In FIG. 6, a character G shows a spectrum distribution with respect to relative luminous intensity in a green fluorescent material of the sulfide family such as active zinc sulfide with gold, copper and aluminum (ZnS:Au, Cu and Al), the distribution having a main spectral wavelength equal to about 535 nm.

Similarly, a character R shows a spectrum distribution with respect to relative luminous intensity in a red fluorescent material of the rare earth family such as active oxygen yttrium sulfide with europium ($Y_2O_2S$:Eu). The spectrum distribution has a main spectral wavelength equal to about 626 nm.

Roman numerals II and III in FIG. 6 illustrate distributions of spectral transmittance for face plates on which fluorescent screens are formed. The distribution shown by II is for a clear type face plate in which the spectral transmittance is equal to about 85% in the visible region while the distribution shown by III is in a tint type face plate wherein the spectral transmittance is equal to 50%.

The lower the spectral transmittance of the face plate, the lower the luminance in the fluorescent screen of the color cathode ray tube. This will be apparent from the relationship between the blue, green and red fluorescent faces (B, G and R) and the spectum distributions with respect to relative luminous intensity. On the other hand, external light entering the fluorescent face of the color cathode ray tube can be effectively removed. This is advantageous in the contrast property. With the recent increased requirement of quality in color televisions, the tint type face plate is now currently used.

Roman numeral I of FIG. 6 shows a distribution of spectral transmittance in the aforementioned anti-charge treatment type selective light absorption film 22 formed on the external surface of the face plate so as to further improve the contrast property. The peak of absorption A is midway between the main spectral wavelengths of the green and red fluorescent faces (G and R), that is, between 535 nm and 626 nm. If the peak of absorption A in the anti-charge treatment type selective light absorption film 22 is near these main spectral wavelengths of the green and red fluorescent faces (G and R), it is disadvantageous with respect to the luminance in the fluorescent face of the color cathode ray tube. Taking half-width or other factors into consideration, thus, the peak of absorption A should be normally placed in an absorption band ranged between 570 nm and 610 nm.

Since the light rays having wavelengths falling into this range coincide with the relatively high visually sensitive region of the human eye, the contrast property can be improved by absorbing and removing the light rays in this region from the external light rays (white light).

More particularly, the selective light absorption film 22 of the anti-charge treatment type color cathode ray tube constructed in accordance with the prior art has a peak of absorption A placed in a region ranged between 570 nm and 610 nm, which provides an optical property falling in the region of relatively high visual sensitivity of the human eye and is less influenced by the light rays from the fluorescent face of the color cathode ray tube. In such a manner, the prior art intends to improve the contrast performance by effectively absorbing the external light rays while maintaining the luminous property of the fluorescent face in the color cathode ray tube.

The selection of organic or inorganic dye or pigment having the aforementioned optical characteristics is very important. With the curve I, the peak of absorption A is placed at the spectral wavelength of 580 nm.

In a color cathode ray tube 31 having an anti-charge treatment type selective light absorption film, the light absorption of organic or inorganic dye or pigment to be mixed in the base coating is relatively broadly ranged. For example, with green rays from the fluorescent face, the selective light absorption film 22 will absorb the tail part of the main spectral wavelength on the longer wavelength side. With red rays, the sub-peak part of the main spectral wavelength thereof on the shorter wavelength side will be absorbed by the selective light absorption film 22. Thus, it is possible to improve the color emission tone while improving the luminance property.

If the end of the spectrum is absorbed too much, the luminance itself can be undersirably degraded.

From the standpoint of the luminance property in the fluorescent face, therefore, the relationship between the half-width of the absorbing band in the distribution of spectral transmittance (I) on the anti-charge treatment type selective light absorption film 22 formed on the external surface of the face plate, the position of the peak of absorption A in the same distribution of spectral transmittance and the distributions of spectra with respect to the relative emission intensity of the green and red fluorescent materials (G and R) is very important.

FIG. 7 shows a curve (IV) illustrating a distribution of spectral transmittance in an anti-charge treatment type selective light absorption film 22 which is further improved in contrast by having the peak of absorption A in the main absorbing band placed at 580 nm, between G and R, as well as the peak of absorption D in the auxiliary absorbing band placed at 480 nm, between B and G.

Since the auxiliary absorbing band is slightly out of the region of relatively high visual sensitivity of the human eye, it cannot be expected that the absorption in the auxiliary absorbing band improves the contrast property over that of the main absorbing band. However, the overall contrast property can be improved in comparison with only the absorption of the main absorbing band.

If such an auxiliary absorbing band is provided between B and G in order to make a further improvement in contrast, another severe problem occurs with respect to luminance on the fluorescent face.

Both the fluorescent materials B and G are of the sulfide family and have very broad distributions of emission spectrum, as will be apparent from FIG. 7.

In addition, the optical absorptive characteristics of the organic or inorganic dyes and pigments used to provide the absorption of the auxiliary absorbing band as mentioned above are relatively broad, as shown by the curve IV in FIG. 7.

If a relatively broad light absorptive property is added between the inherently broad emission spectra of the blue and green fluorescent members B and G, the emission rays from the longer wavelength side of the main spectral wavelength in the blue fluorescent material B and from the shorter wavelength side of the main spectral wavelength in the green fluorescent material G will be greatly absorbed to highly reduce the luminance of the fluorescent face.

SUMMARY OF THE INVENTION

In order to overcome the aforementioned problems, it is an object of the present invention to provide a color cathode ray tube having a selective light absorption film which is improved in contrast property on the fluorescent face thereof and also which can minimize the reduction of the luminance on the same fluorescent face.

To this end, the present invention provides a color cathode ray tube comprising:

A) a face plate having blue, green and red fluorescent elements, each of the fluorescent elements being adapted to emit blue, green- or red-colored light when an electron beam impinges thereon, the blue and green fluorescent element being made of a material in the sulfide family while the red fluorescent element being formed of a material in a rare earth family, the red fluorescent element having a linear emission spectrum; and B) a selective light absorption film formed by applying a selective light absorption liquid onto the external surface of the face plate, the liquid consisting of a transparent base coating with either a dye and/or pigment mixed thereinto, the selective light absorption film having optical characteristics including main and auxiliary absorbing bands, the absorption peak of the main absorbing band belonging to a wavelength region between the wavelength in the primary spectrum of the green-colored light and the wavelength in the primary spectrum of the red-colored light, and the absorption peak of the auxiliary absorbing band belonging to wavelengths longer than that in the primary spectrum of the red-colored light.

If such an auxiliary absorbing band is set, the absorption of light emitted from a fluorescent element is suppressed even if the light absorption of an absorbing band is broad.

More particularly, it is desirable that the absorption peak of the main absorbing band is ranged between 570 nm and 610 nm while the absorption peak of the auxiliary absorbing band is ranged between 640 nm and 690 nm. Where the blue fluorescent material is ZnS:Ag; the green fluorescent material is ZnS:Au, Cu and Al and the red fluorescent material is $Y_2O_2$:Eu, it is preferable that the absorption peak of the main absorbing band is set at 580 nm and the absorption peak of the auxiliary absorbing band is set at 660 nm. The base coating in the selective light absorption liquid may be any one of a number of plastic coatings such as epoxy, acryl and the like or an alcoholic solution of silicon alkoxide having —OH group or —OR group.

The selective light absorption film of the present invention may or may not have an anti-charging function. The anti-charging function may be realized by providing an electrically conductive member for connecting the selective light absorption film to ground and means for causing the selective light absorption film to discharge the external face plate surface through the conductive member.

DETAILED DESCRIPTION OF PREFERRED EMBODIMENT

Figure 1:
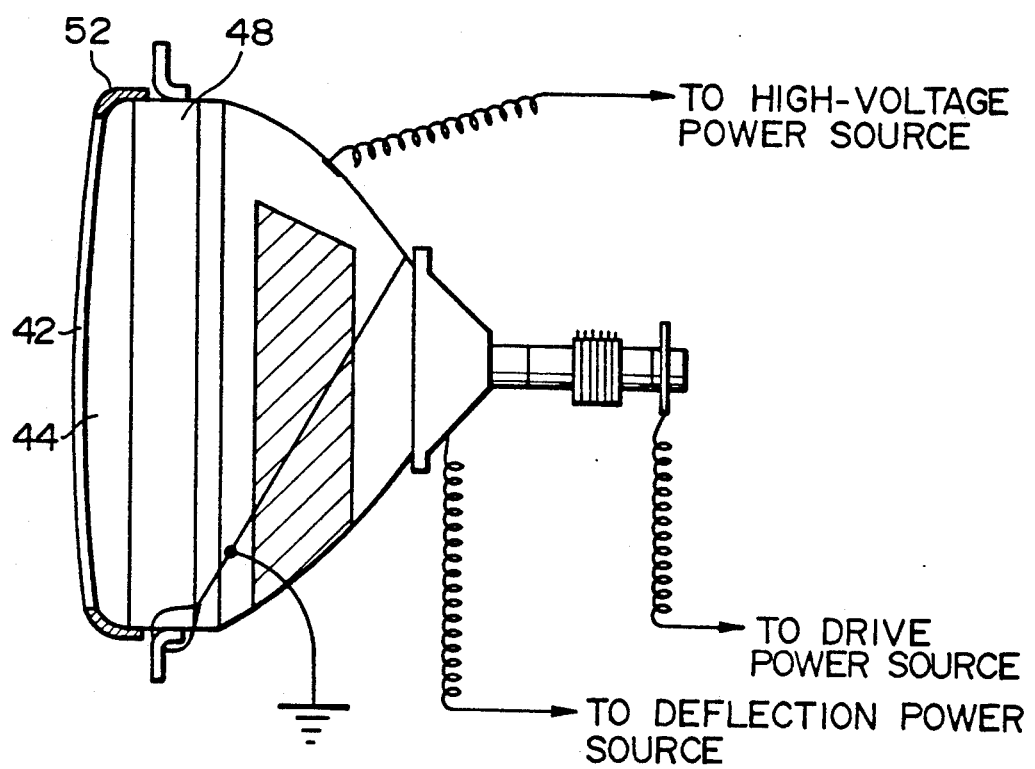
FIG. 1 is a side view of one embodiment of a color cathode ray tube having a selective light absorption film constructed in accordance with the present invention.
Figure 5:
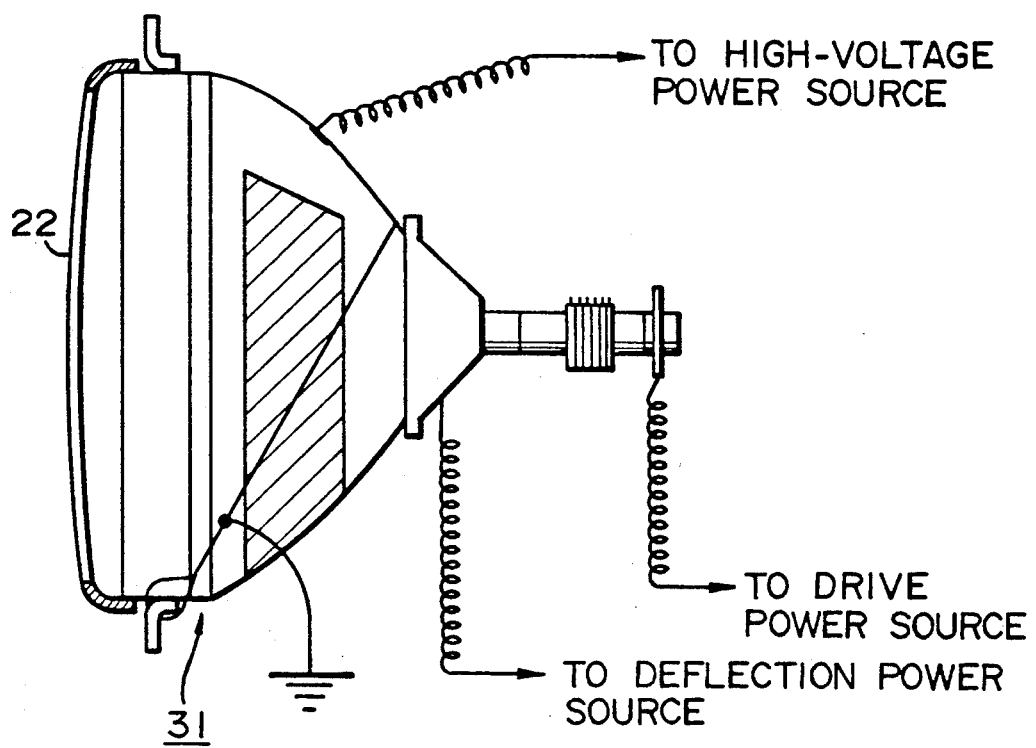
FIG. 5 is a side view of an anti-charge treatment type color cathode ray tube having a selective light absorption film which is constructed in accordance with the second embodiment of the prior art.
Figure 6:
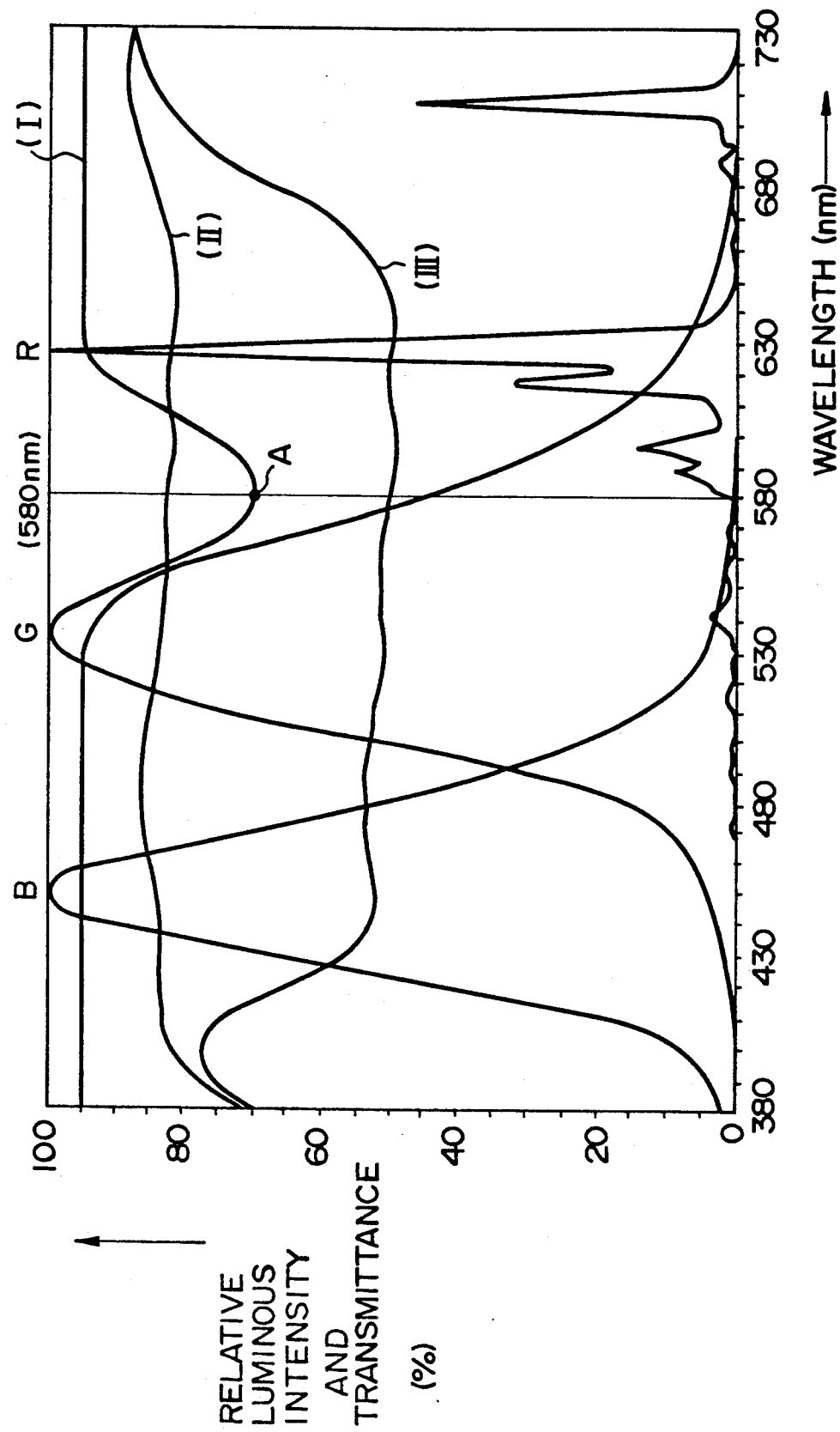
FIG. 6 shows the optical characteristics of the selective light absorption film in the cathode ray tube shown in FIG. 5.
Figure 7:
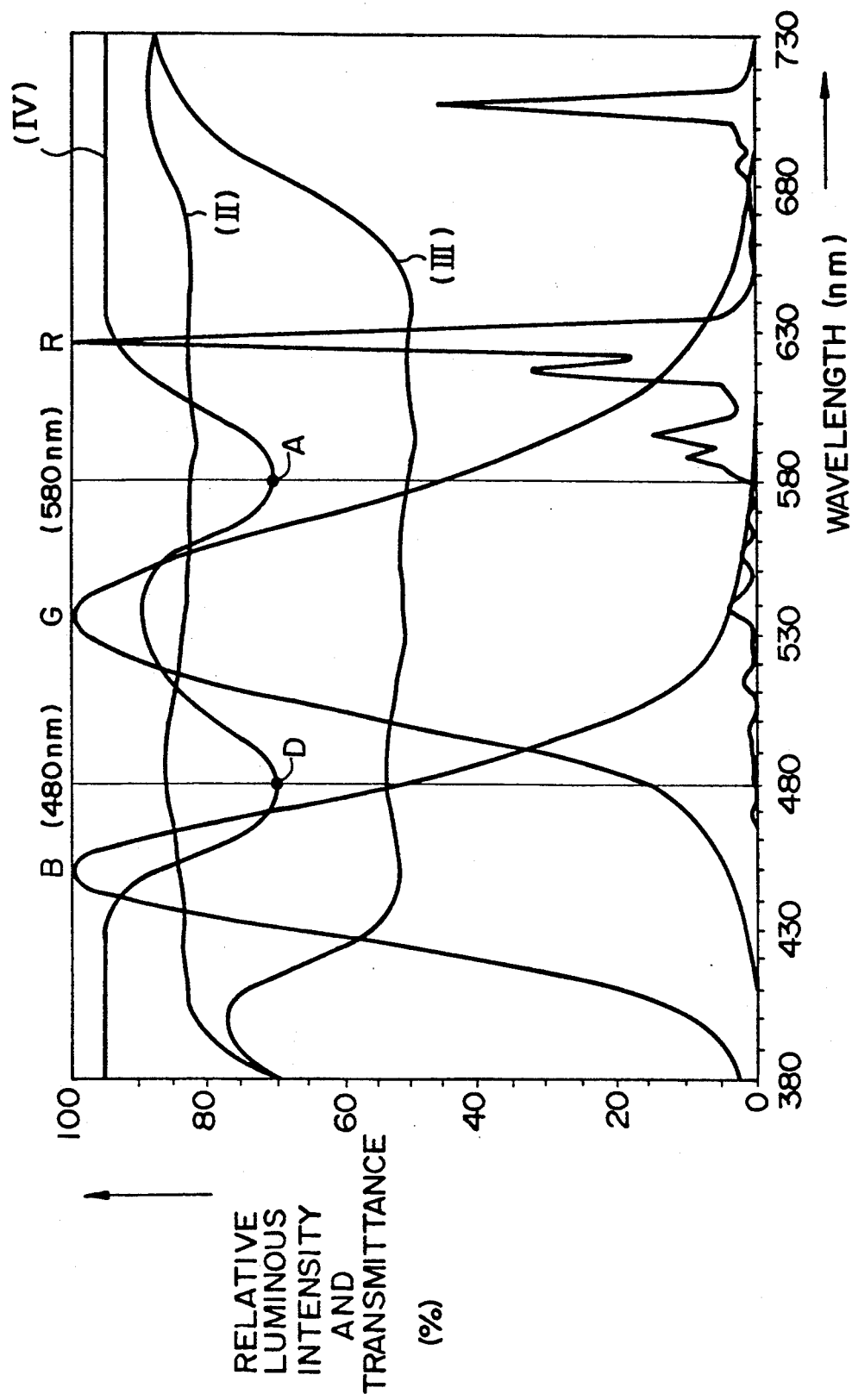
FIG. 7 is a graph illustrating the optical characteristics of the other selective light absorption film where R=a spectrum distribution with respect to relative luminous intensity in the red fluorescent element; G=a spectrum distribution with respect to relative luminous intensity in the green fluorescent element; B=a spectrum distribution with respect to relative luminous intensity in the blue fluorescent element; I and IV=distributions of spectral transmittance in the selective light absorption films; II=a distribution of spectral transmittance in a clear type face plate; and III=a distribution of spectral transmittance in a tint type face plate.
Figure 8:
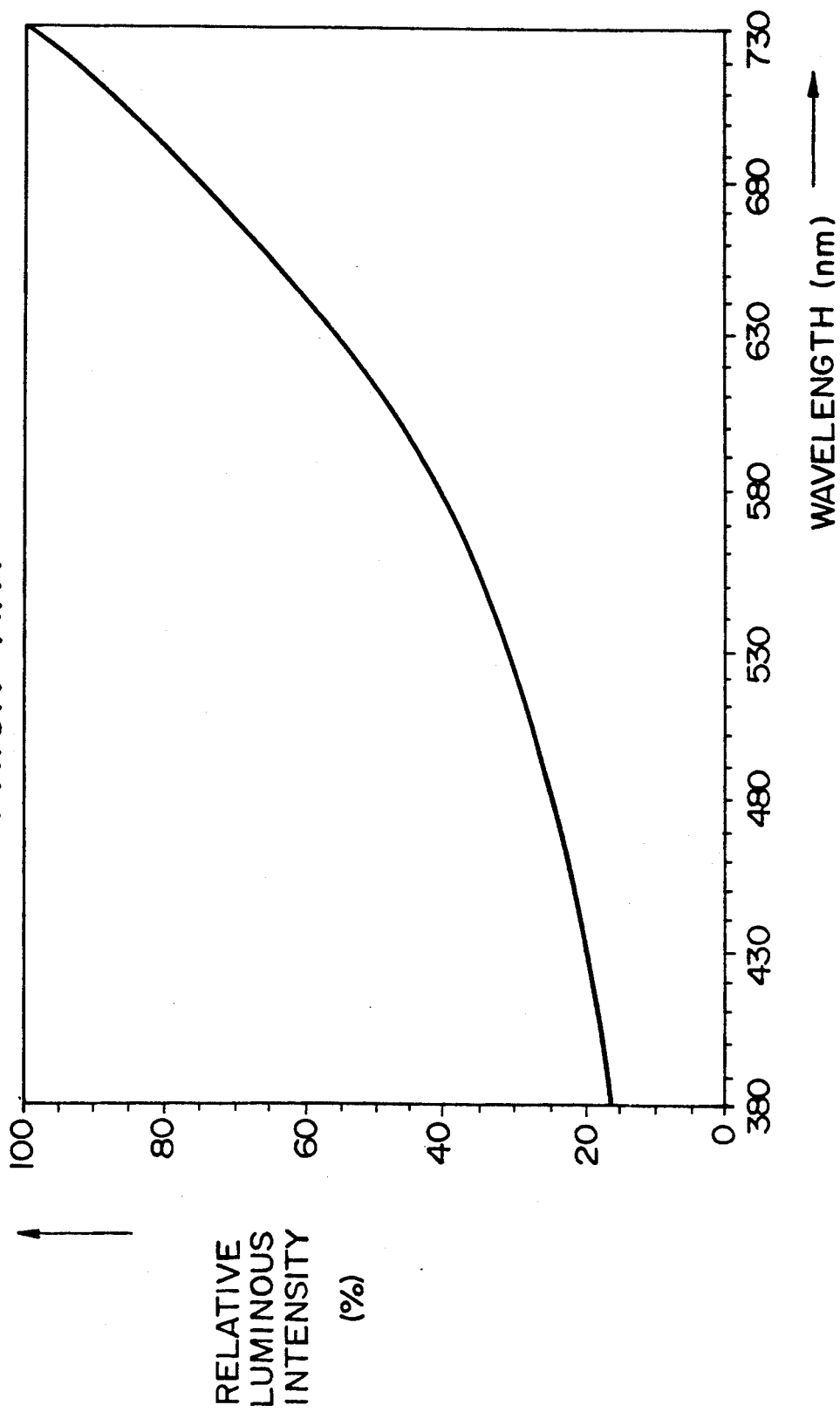
FIG. 8 is a graph illustrating the distribution of the emission spectrum of an incandescent lamp.

Referring to FIG. 1, there is shown one embodiment of the present invention which has an arrangement basically similar to the prior art shown in FIG. 5. More particularly, the color cathode ray tube shown in FIG. 1 comprises a face plate 44 and a selective light absorption film 42 formed thereon at the external surface. Although not illustrated, the internal surface of the face plate 44 includes red, green and blue fluorescent elements coated thereon. The selective light absorption film 42 is formed on the external surface of the face plate 44 by applying a selective light absorption liquid thereon. The essential feature of this embodiment is that the selective light absorption film 42 has a distribution of spectral transmittance different from that of the selective light absorption film 22 which has been described above.

Figure 2:
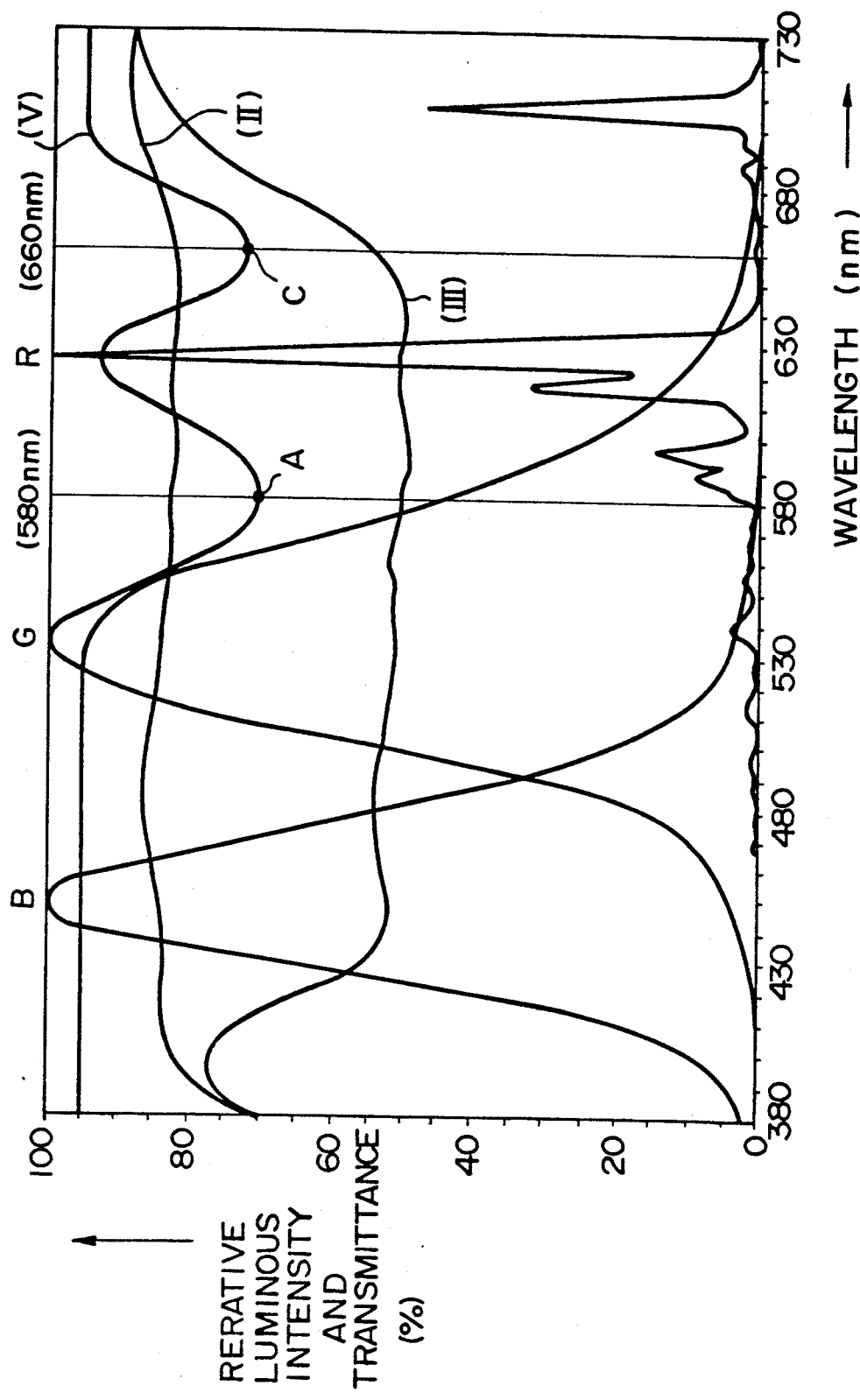
FIG. 2 is a graph illustrating the optical characteristics of the selective light absorption film in the cathode ray tube shown in FIG. 1 where R=a spectrum distribution with respect to relative luminous intensity in the red fluorescent element; G=a spectrum distribution with respect to relative luminous intensity in the green fluorescent element; B=a spectrum distribution with respect to relative luminous intensity in the blue fluorescent element; V=a distribution of spectral transmittance in the selective light absorption film; II=a distribution of spectral transmittance in a clear type face plate; and III=a distribution of spectral transmittance in a tint type face plate.
Figure 3:
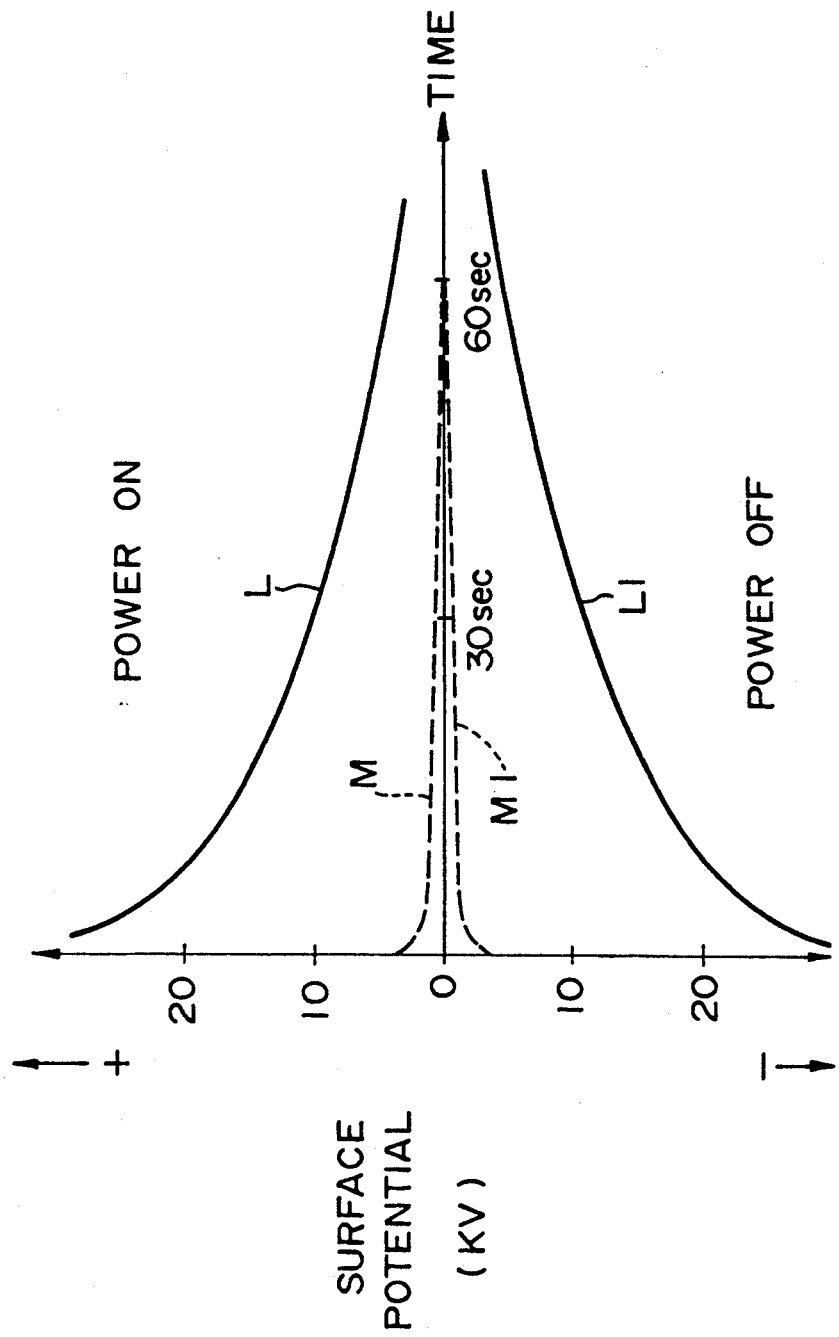
FIG. 3 is a graph showing variations in the surface potential on the face plate of a cathode ray tube where L=a curve illustrating variations in the surface potential on a non-treatment type cathode ray tube on power-on; L1=a curve illustrating variations in the surface potential on the same cathode ray tube on power-off; M=a curve illustrating variations in the surface potential on the cathode ray tube of FIG. 4 on power-on; and M1=a curve illustrating variations in the surface potential on the cathode ray tube of FIG. 4 on power-off.
Figure 4:
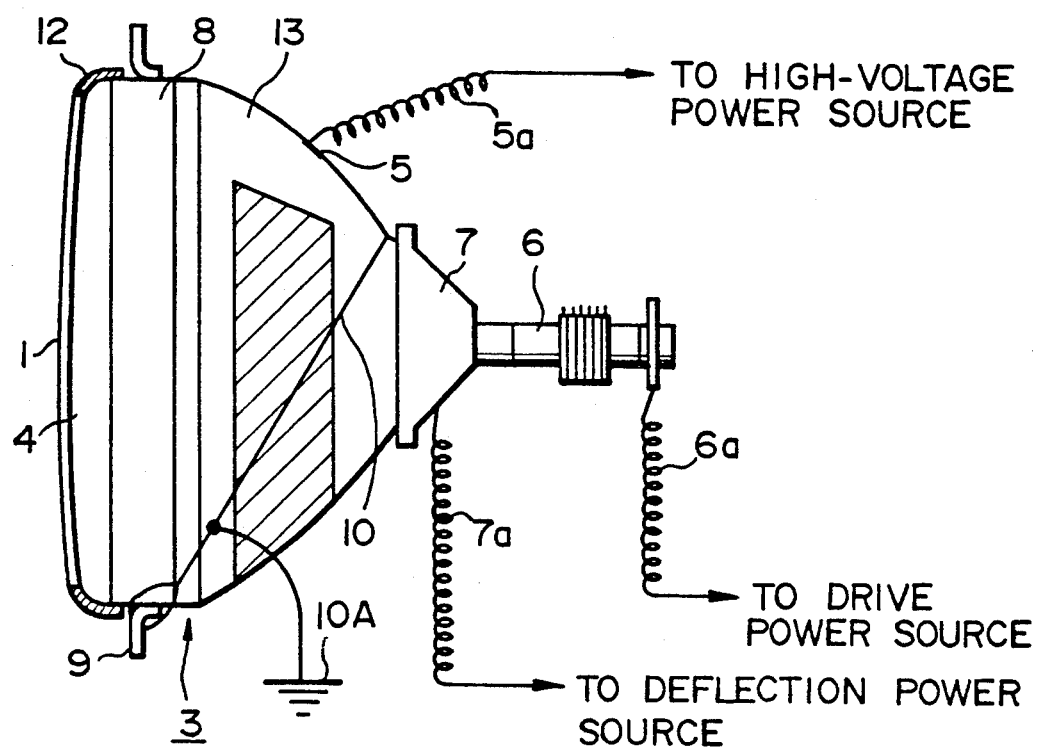
FIG. 4 is a side view of an anti-charge treatment type cathode ray tube relating to the first embodiment of the prior art.

In FIG. 2, a curve V shows a distribution of spectral transmittance in the selective light absorption film 42 of this embodiment.

In the illustrated embodiment, the selective light absorption film 42 is of an anti-charge treatment type and comprises a main auxiliary absorbing band. The absorption peak of the main absorbing band is set in a range between the main spectral wavelengths of the green and red rays from the color cathode ray tube, that is, between 570 nm and 610 nm (at 580 nm in the illustrated embodiment). The absorption peak of the auxiliary absorbing band is set in a range between 640 nm and 690 nm on the longer wavelength side of the main spectral wavelength in the red light emission (at 660 nm in the illustrated embodiment).

The emission spectrum of the green fluorescent element G is broad while the emission spectrum of the red fluorescent element R is in the form of a linear and very thin line. Even with the absorption peak of the main absorbing band having a relatively broad light absorption, the light emitted from the green and red fluorescent elements can be absorbed less by their main absorbing bands if the absorption peaks are optimally positioned. Thus, the reduction of the luminance in the fluorescent elements can be minimized.

Inherently, there is no useful light emission in the fluorescent face on the longer wavelength side of the main spectral wavelength (626 nm) in the red fluorescent element. Furthermore, since the red fluorescent element has a very thin and linear emission spectrum, the light emission from the red fluorescent element can be absorbed less by optimally designing the position of the absorption peak C even if the absorption peak of the auxiliary absorbing band has a relatively broad light absorption. This can minimize the reduction of luminance in the fluorescent element.

Taking various factors such as half-width and the like in the absorbing band into consideration, it appears that the optimum position of the absorption peak C is preferably at 640 nm or higher, because it is very disadvantageous to the luminance if the optimum absorption peak is too near the main spectral wavelength (626 nm) in the red fluorescent element R.

Since the visual sensitivity of the human eye is extremely low on the wavelength side larger than 690 nm, the positioning of the absorption peak C at such a wavelength region does not contribute very much to the improvement of the contrast property.

It is thus preferabal that the absorption peak C of the auxiliary absorbing band is set in the range between 640 nm and 690 nm.

If a color cathode ray tube has a selective light absorption film having such main and auxiliary absorbing bands, the color cathode ray tube can be remarkably improved in contrast particularly when an incandescent lamp is used therein.

Since most incandescent lamps emit light rays by heating a tungsten filament, the emission spectrum distribution in the incandescent lamp will have a relative luminous intensity or emission energy intensity gradually increasing towards the longer wavelength side.

An absorbing band for external light (white light) is positioned on the side of relatively longer wavelength if a color cathode ray tube has a selective light absorption film having a distribution of spectral transmittance as shown by a curve V in FIG. 2. As a result, the emission energy of the incandescent lamp providing an external light (white light) can be effectively eliminated to improve the contrast property of the color cathode ray tube.

This is particularly useful when the color cathode ray tube having the selective light absorption film according to the present invention is used in TV sets which are frequently placed in rooms illuminated by incandescent lamps.

In the aforementioned embodiments of the present invention, the transparent conductive film 42 may be electrically connected with a metallic explosion-proof band 48 through a conductive tape 52 to provide an anti-charging function. In addition to such an anti-charging function, the transparent conductive film 42 may also have a selective light absorption property by forming it of a base coating into which an organic or inorganic dye or pigment is mixed. It is, however, to be understood that the present invention may be similarly applied to a transparent conductive film having no anti-charging function.

Although the preferred embodiments of the present invention have been described as to a transparent base coating made of an alcoholic solution of silicon alkoxide having —OH group or —OR group, the present invention may be equivalently applied to other plastic coatings of epoxy and acryl families.

As will be apparent from the foregoing, the present invention provides a selective light absorption film having main and auxiliary absorbing bands, the absorption peaks of which are positioned on the opposite end edges of the main spectral wavelength in light rays from the red fluorescent element of the rare earth metals family which has a very thin and linear emission spectrum. Consequently, even if the light absorption in each of the main and auxiliary absorbing bands is relatively broad, the light emission of the fluorescent face can be absorbedless to improve the contrast and to suppress the reduction of the luminous property in the fluorescent face.

What is claimed is:

1. A color cathode ray tube comprising:
   a face plate including,
   a blue fluorescent element of a sulfide family disposed on an inner surface for emitting a blue-colored light when an electron beam impinges the blue fluorescent element,
   a green fluorescent element of a sulfide family disposed on an inner surface for emitting a green-colored light when an electron beam impinges the green fluorescent element, and
   a red fluorescent element of a rare earth metals family disposed on an inner surface for emitting a red-colored light with an emission spectrum thereof being linear when an electron beam impinges the red fluorescent element; and
   a selective light absorption film formed on an external surface of said face plate by applying a selective light absorption liquid onto said external surface; said liquid consisting of a transparent base coating formed of a material from a silica family and a colored compound mixed into said base coating;
   said selective light absorption film having optical characteristics including a main absorbing band and an auxiliary absorbing band, an absorption peak of said main absorbing band being in a first wavelength region between a main spectral wavelength of the emitted green-colored light and a main spectral wavelength of the emitted red-colored light, and an absorption peak of said auxiliary absorbing band being in a second wavelength region having wavelengths, said wavelengths of said second wavelength region being longer than that of a main spectral wavelength of the emitted red-colored light.

2. The color cathode ray tube as defined in claim 1 wherein the absorption peak of said main absorbing band is in a range between 570 nm and 610 nm and the absorption peak of said auxiliary absorbing band is in a range between 640 nm and 690 nm.

3. The color cathode ray tube as defined in claim 1 wherein said blue fluorescent element is formed on ZnS:Ag, said green fluorescent element is formed of ZnS:Au, Cu and Al, and said red fluorescent element is formed of $Y_2O_2S:Eu$.

4. The color cathode ray tube as defined in claim 3 wherein the absorption peak of said main absorbing band has a wavelength equal to 580 nm and the absorption peak of said auxiliary absorbing band has a wavelength equal to 660 nm.

5. The color cathode ray tube as defined in claim 1, further comprising:
   an electrically conductive member for grounding said selective light absorption film;
   said selective light absorption film being electrically conductive, whereby charges on said selective light absorption film can be discharged to ground through said conductive member.

6. The color cathode ray tube as defined in claim 1 wherein said transparent base coating is an alcoholic solution of silicon alkoxide having an —OH group.

7. The color cathode ray tube as defined in claim 1 wherein said transparent base coating is an alcoholic solution of silicon alkoxide having an —OR group.

* * * * *